United States Patent
Ogami

[19]

[11] Patent Number: 6,102,295
[45] Date of Patent: Aug. 15, 2000

[54] METHOD AND APPARATUS FOR DECODING SYMBOLS BY DECLARING ERASURES OF ELEMENT CHARACTERISTICS

[75] Inventor: Kenneth Yuji Ogami, Bothell, Wash.

[73] Assignee: Intermec IP Corp., Beverly Hills, Calif.

[21] Appl. No.: 09/007,277

[22] Filed: Jan. 14, 1998

[51] Int. Cl.[7] ........................... G06K 7/10
[52] U.S. Cl. ................... 235/472.01; 235/462.16; 235/462.15
[58] Field of Search .............. 235/462.01, 462.07, 235/462.13, 462.15, 462.25, 462.16, 462.45, 472.01

[56] References Cited

U.S. PATENT DOCUMENTS

| | | | |
|---|---|---|---|
| 3,886,521 | 5/1975 | Dobras | 235/462.07 |
| 3,906,202 | 9/1975 | Meyer | 235/61.11 |
| 3,916,154 | 10/1975 | Hare et al. | 235/61.11 |
| 4,354,101 | 10/1982 | Hester et al. | 235/463 |
| 4,533,825 | 8/1985 | Yamada | 235/463 |
| 4,817,115 | 3/1989 | Campo et al. | 375/22 |
| 4,855,581 | 8/1989 | Mertel et al. | 235/462 |
| 4,859,840 | 8/1989 | Hasegawa et al. | 235/463 |
| 4,973,830 | 11/1990 | Ouchi et al. | 235/463 |
| 5,036,182 | 7/1991 | Ouchi et al. | 235/462 |
| 5,086,215 | 2/1992 | Carsner et al. | 235/462 |
| 5,184,005 | 2/1993 | Ukai et al. | 235/472 |
| 5,270,525 | 12/1993 | Ukai et al. | 235/472 |
| 5,311,001 | 5/1994 | Joseph et al. | 235/462 |
| 5,324,924 | 6/1994 | Cai et al. | 235/462.22 |
| 5,329,105 | 7/1994 | Klancnik et al. | 235/463 |
| 5,336,874 | 8/1994 | Hasegawa | 235/466 |
| 5,352,878 | 10/1994 | Smith et al. | 235/462 |
| 5,412,196 | 5/1995 | Surba | 235/462.01 |
| 5,457,309 | 10/1995 | Pelton | 235/462 |
| 5,537,431 | 7/1996 | Chen et al. | 371/54 |
| 5,550,365 | 8/1996 | Klancnik et al. | 235/462.01 |
| 5,600,118 | 2/1997 | Sato et al. | 235/462.11 |
| 5,635,697 | 6/1997 | Shelhammer et al. | 235/462.01 |

*Primary Examiner*—Michael G Lee
*Assistant Examiner*—Daniel St. Cyr
*Attorney, Agent, or Firm*—Perkins Coie LLP

[57] ABSTRACT

A method and apparatus for reading optical symbols is disclosed, which employs defined erasure zones for grading symbols, and for permitting soft decisions to be made with respect to further processing of the symbols. The erasure zones are defined between nominal values within the range of nominal values for the measurable characteristics of the symbol elements which comprise the symbol. The measured actual values of the measurable characteristic are compared to the erasure zones. The number of symbol elements having measured actual values within any one of the erasure zones is used to determine the appropriate steps for further processing of the optical symbol. Measurable characteristics can include dimensions such as width, length, area, volume, as well as other optical characteristics such as color or hue, and shade or depth.

47 Claims, 6 Drawing Sheets

METHOD AND APPARATUS FOR DECODING SYMBOLS BY DECLARING ERASURES OF ELEMENT CHARACTERISTICS

TECHNICAL FIELD

The present invention relates generally to the field of machine vision, and more specifically to method and apparatus for reading and decoding machine readable symbols.

BACKGROUND OF THE INVENTION

A symbol reader is a device used to extract the information that is optically encoded in a symbol. Often the information is converted into computer-compatible digital data. The decoded data can be transmitted directly to an attached computer, can be stored locally for later use, or can used by an application program that is resident in the symbol reader. The symbol reader can be considered as two separate elements: an input device and a decoder. These two elements can reside in separate physical packages connected by a cable or other communications link, or they can reside in a single unit.

The input device is a unit that employs electro-optical techniques to acquire data from the symbol. The input device is often an active system, wherein it illuminates the symbol with light energy, and examines the amount of light reflected by a localized area of the symbol. Many input devices employ a light beam, such as a laser beam, which is scanned over the symbol. The actual scanning motion is provided by the operator's hand motion, by an internal scanning system, or by movement of the symbol past the input device. In other devices, the symbol is illuminated and light reflected from the symbol is picked up by a receiver, such as a charged-coupled detector (CCD) which electrically produces a scanning motion. The light areas of the symbol will reflect more light than the dark areas. The light reflected from the symbol is directed to an optical receiver, such as a photodiode detector or charge-coupled detector (CCD), which generates a small current that is proportional to the amount of light returned. An amplifier in the input device increases the signal from the optical receiver to a usable level. The instantaneous electrical output from the input device is representative of the localized reflectivity of the symbol at the point that is being scanned. In order to differentiate between the light and dark areas, the analog voltage is typically converted and processed into a digital waveform by a circuit known as a wave shaper.

There are currently a large variety of machine readable symbologies in use. Currently, the predominant type are bar code symbologies. The bar code symbologies optically encode data through the use of an array of differing width parallel bars and spaces. Bar code symbologies fall into two general categories: discrete and continuous. In a discrete code, each character can stand alone and can be decoded independently from the adjacent characters. Each character is separated from its neighbor by loosely toleranced intercharacter gaps, which contain known information. Every character has a bar on each end. The continuous code symbologies have no intercharacter gaps, every character beginning with a bar and ending with a space. The end of one character is indicated by the start of the next character. Examples of bar code symbologies include the Universal Product Code (UPC), European Article Numbering system (EAN), Interleaved Two-of-Five, Codabar, Code 39, Code 128, Code 93, Code 49, and Code 16K. A variety of two-dimensional symbologies or matrix codes also exist.

Matrix codes encode information in the area of the symbol. Popular area codes include: Codablock, USD-5, Vericode, Datacode, UPS code, PDF417, Datamatrix and Code One.

In a bar code symbol, data is conveyed in the widths of the bars and spaces. Two basic type of bar codes exist: those that employ only two element widths (wide and narrow), and those that use multiple widths. In a two-width symbology, the ratio between wide and narrow element widths is called N. The element widths are measured in terms of modules. A "module" is the narrowest nominal width unit of measure is a bar code symbology (a one-wide bar or space). "Nominal" refers to the intended value of a specific parameter, regardless of printing errors, etc. N is typically allowed to vary over some range (usually from 2.0 to 3.0), but must be constant for a given symbol. As N gets larger, the allowable printing tolerance also increases. If a bar code is printed within published specifications ("in spec"), data security is not compromised for smaller values of N.

In a multiple width symbology, bars and spaces can assume several different width values. Most multiple width values are modular, meaning that the length of a character is subdivided into a predetermined number of modules, and a bar or space width is always an integral number of modules. Multiple width symbologies are usually continuous and often decoded using edge to similar edge algorithms. This technique involves the measurement of distances between similar edges of adjacent elements rather than the measurement of actual element widths. Hence, these multiple width symbologies will not be negatively affected by uniform growth or shrinkage.

For a bar code system to be successful, it should allow data to be collected rapidly, economically, and accurately. The performance of a bar code system is highly dependent upon the quality of the printed symbols. Most bar code applications must therefore be able to handle symbols that deviate from published printing standards in some respect or another. One of the most significant contributions to errors is deviation of element widths from their nominal values. Poor quality symbols will result in lower first read rates. The first read rate is a probability that the reader will read and correctly decode information on its first pass. Another significant factor is substitution error rate. The substitution error rate is the likelihood of an error being made in the decode. The substitution error rate is strongly influenced by the first read rate. For example, it would be possible to use an aggressive algorithm to extract information from any arrangement of light and dark areas. Such an algorithm would result in a very high first read rate, but would have a very poor substitution error rate. Conversely, the algorithm could be designed to insist that the perceived element widths be very close to the nominal values. This algorithm would have a very low first read rate but would also have a very low substitution error rate. Reading equipment manufacturers must strike a compromise that will ensure a good first read rate when scanning in spec symbols, while minimizing substitution error rate across a wide range of print quality.

Currently, symbol readers distinguish between two symbol elements by selecting a median value between the nominal widths of the two elements. The measured actual value of the symbol element is compared to the median value. For example, if a symbol is comprised of a narrow element and a wide element, the narrow element having a nominal width of 10 modules, and the wide element having a nominal width of 20 modules (N=2.0), then the median value selected may be 15 modules. Any symbol element which had a measured actual value of 15 modules or less would be classified as a narrow element by the reader. Any element which had a measured actual value of greater than 15 counts would be classified as a wide element. This approach introduces problems where due to errors, such as a printing error, a narrow element is actually printed at a width greater than 15 modules, or a wide element is printed having a width of less than 15 modules. A symbol reader encountering this type of deviation from the nominal standard would be unable to interpret the symbol or would incorrectly interpret the symbol.

SUMMARY OF THE INVENTION

The present invention overcomes the limitations of the prior art by providing a method and apparatus for decoding symbols that employs an erasure zone defined between the nominal values of symbol elements for identifying those symbol elements in which an out of tolerance error may exist and permitting a decision to be made with respect to the handling of such symbol elements.

In one exemplary embodiment of the invention, a symbol reader takes the form of a bar code reader having a scanner and a decoding unit, the scanner including an optical source and an optical receiver, the decoding unit including a microprocessor and a memory. The optical source produces an optical beam for scanning a bar code symbol. The optical receiver is configured to receive the optical beam after the optical beam has been reflected from the bar code symbol, and to produce a set of dimensional data which corresponds to a measurable characteristic of the symbol elements, such as the width of bar and space elements in the bar code symbol. The set of dimensional data points correspond to the measured actual value of each of the symbol elements and may be expressed as counts. Each of the symbol elements has a nominal value associated with it. An erasure zone is defined between each pair of adjacent nominal values in the range of nominal values for the particular symbology. In the case of a two element bar code symbol, the range of nominal values might be {10, 20}, where the narrow symbol element has a nominal value of 10 counts and the wide symbol element has a nominal value of 20 counts. In this example, the erasure zone would be defined between the narrow element and the wide element, for instance, the erasure zone may extend from 14 counts to 16 counts. Each of the dimensional data points in the set of dimensional data points would be compared with the erasure zone to identify those dimensional data points within the erasure zone, and thereby identifying those symbol elements with a high probability of being misinterpreted. A grade might then be assigned to the symbol based on the number of symbol elements whose dimensional data points fell within the erasure zone. The grade could be tested against a variety of conditions to determine the appropriate method for handling the symbol. For example, if the assigned grade satisfied a first condition, then the symbol could be accepted and decoded. If the assigned grade satisfied a second condition, then the symbol could be rescanned, or rejected. Alternatively, if the assigned grade satisfied the second condition, then error correction could be performed on the symbol, such as checksum or structural error correction.

The measurable characteristic of the symbol is not restricted to width, but may include other measurable characteristics, such as but not limited to, height, area, volume, hue or color, and shade, depth or intensity.

DETAILED DESCRIPTION OF THE INVENTION

Described in detail herein is an apparatus and method for reading a symbol and identifying the symbol elements which fall within an erasure zone to permit a decision to be made about how the symbol is to be handled. In the following description numerous specific details are set forth such as particular symbologies, algorithms, and symbol reading apparatus, in order to provide a thorough understanding of the invention. One skilled in the relevant art, however, will readily recognize that the present invention can be practiced without specific details, or with other such details. In other instances, well-known structures and operations are not shown in detail in order to avoid obscuring the present invention.

Figure 1:
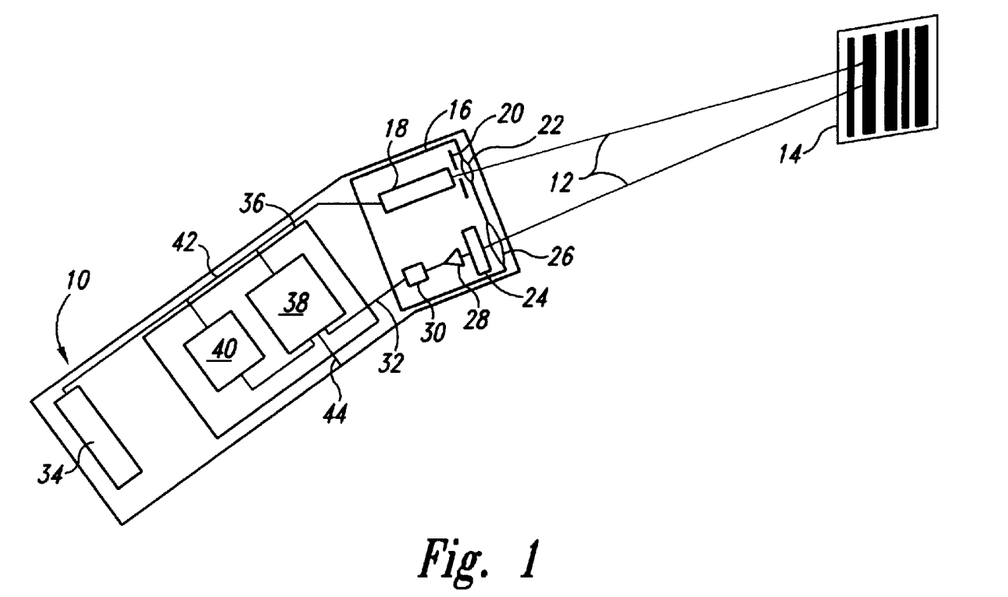
FIG. 1 is a cross-sectional view of an embodiment of a bar code reader reading a bar code symbol.

As shown in FIG. 1, an embodiment of the present invention is incorporated in a symbol reader 10, which employs an optical beam 12 to read a symbol 14. The symbol reader 10 includes an optical scanner 16 having an optical source 18 for producing the optical beam 12. The optical source 18 may pass the optical beam 12 through a baffle 20 and an optical lens 22. The optical source 18 may take the form of a visible or near visible light source, such as a light-emitting diode (LED), an incandescent light source, or a laser light source. The optical scanner 16 may also include conventional mechanisms for scanning the optical beam 12, such as rotating mirrors (not shown). The optical scanner 16 further includes an optical receiver 24 for receiving the optical beam 12 after it is reflected from the symbol 14. An optical lens 26 may be provided for focusing the reflected optical beam 12 onto the optical receiver 24. The optical receiver 24 may be formed as a photodiode array sensor, such as a charge-coupled device (CCD).

The optical scanner 16 may further include an amplifier 28 for amplifying the signal from the optical receiver 24 and a wave shaper 30 for converting an analog voltage from the amplifier 28 into a digital signal which comprises a set of dimensional data 32.

Figure 2:
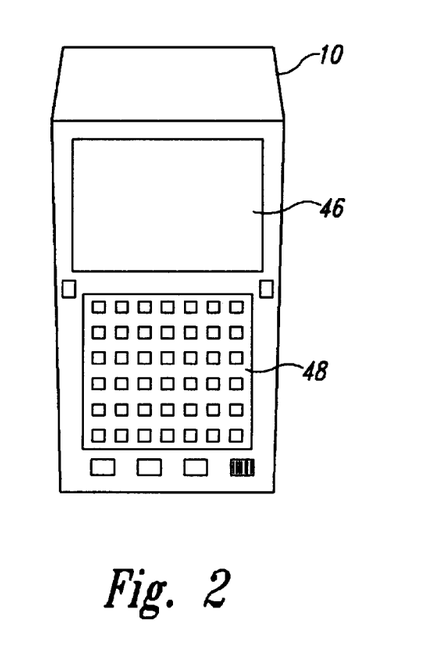
FIG. 2 is a schematic view of a second embodiment of a bar code reader, wherein the decoder is external to the bar code reader.

The optical source 18 may be powered from an external source, or an internal source such as a rechargeable battery 34. A decoder 36 having a microprocessor 38 and a memory 40 is provided for decoding the dimensional data 32. As shown in FIG. 1, the decoder 36 may be integrally formed with the symbol reader 10. Alternatively, as shown in FIG. 2, the decoder 36' may be external to the symbol reader 10'. The microprocessor 38 has an input port for receiving the set of dimensional data 32 generated by the optical receiver 30. The microprocessor 38 also has input and output ports for communicating with input and output ports of the memory 40. The microprocessor 38 and the memory 40 may receive electrical energy from the battery 46 through a power bus 42, or from some other power source. The microprocessor 38 further has an output port 44 for relaying decoded symbol information or error messages to any of a variety of internal or external devices.

Figures 3, 4A:
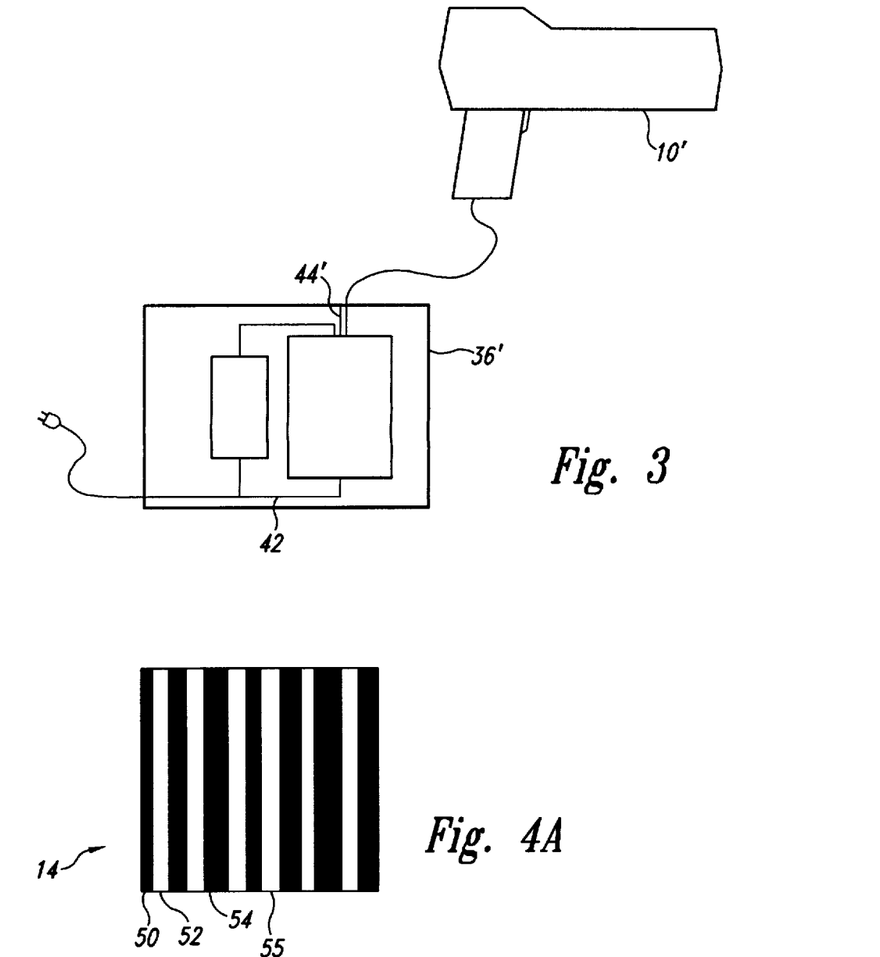
FIG. 3 is a top plan view of the bar code scanner of FIG. 1.
FIG. 4a is a diagram of a two-width bar code symbol.

With reference to FIG. 3, the symbol reader 10 includes a user interface which may include a display screen 46 and a user input device 48. While the user input device 48 is shown as comprising a set of keys in the exemplary embodiment, the user input device 48 may take the form of a mouse, a touch screen, a trackball, a light pen, or any of a variety of conventional user input devices currently known or later developed. The user input device may also take the form of a memory device (not shown) preconfigured with desired input information. The memory device may be selectively loaded by the user into a port (not shown) in the symbol reader 10. The memory device 62 may be used to enter user input which among other things can be employed in defining the erasure zone.

Figure 4B:
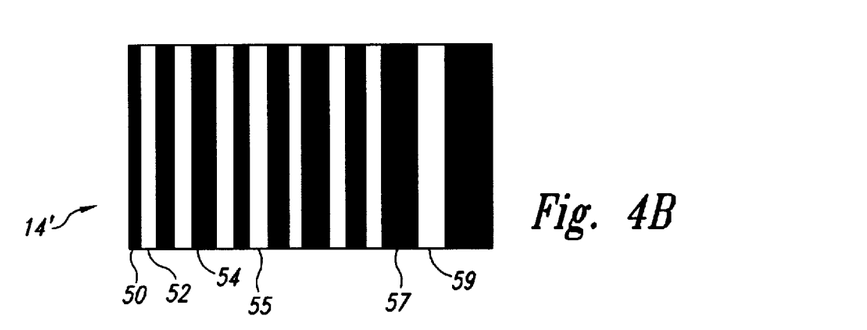
FIG. 4b is a diagram of a three-width bar code symbol.

With reference to FIG. 4a, a two-width bar code symbol 14 is shown, having narrow bars 50, narrow spaces 52, wide bars 54 and wide spaces 55. The measured values for the widths of the bar elements of the symbol 14 of FIG. 4a are 9, 12, 18, 10, 15, 20 and 14, from left to right, respectively. With reference to FIG. 4b, a three-width bar code symbol 14' is shown, having narrow bars 50, narrow spaces 52, wide bars 54, wide spaces 55, and triple wide bars 57 and triple wide spaces 59. The measured values for the widths of the bar elements of the symbol 14' of FIG. 4a are 9, 12, 18, 10, 15, 20, 14, 26 and 35 from left to right, respectively.

While the exemplary embodiment is explained in terms of a two-width bar code symbol, many other forms of optically encoded symbology may be successfully employed. For example, data can be encoded in a bar code symbol having more than two nominal bar character widths. Data may also be encoded in a matrix symbol, in which the area of the symbol elements encode the data. Likewise, the symbology chosen may employ a variety of other measurable characteristics such as geometry, volume, hue or color, or shade, depth or intensity to optically encode data into the symbols of the symbology. Whatever symbology is selected, the data will be encoded in the grouping of a number of symbol elements that comprise the symbol. The symbol elements will all share some common measurable characteristic, such as width, length, area, geometry, volume, hue or color, shade, depth or intensity. The common measurable characteristic shared by the symbol elements will be capable of taking on one of at least two values, and perhaps one of a large number of values, such as the twenty-six letters of the English alphabet or the ten digits 0–9. For example, with a two-width bar code, the common characteristic is the width of a bar, which may have either a narrow nominal width or a wide nominal width.

An exemplary method of practicing the invention will be explained with reference to FIG. 5. In step 56, the symbol reader 10 acquires data from an optically encoded symbol 14. In the exemplary embodiment, this is achieved by scanning the optical beam 12 produced by the optical source 18 across the symbol elements 15 of the symbol 14. Varying amounts of light are reflected back to the optical scanner by the varying reflectivity of the bars and spaces of the symbol 14, including bars 50, 54, and spaces 52, 55. The optical beam 12 reflected back from the symbol 14 is thus modulated by having been scanned across the symbol elements 50, 52, 54 and 55 of the symbol 14.

In step 58, the symbol reader 10 transforms the reflected and modulated optical beam 12 into dimensional data 32. In conventional bar code scanning technology, the dimensional data is often transformed by determining a number of counts (time) that substantially correspond to the actual width of each symbol element. For example, the first two bars of the symbol 14 in FIG. 4a are narrow and may have widths having measured actual values of 9 counts and 12 counts, respectively. The next bar is a wide symbol element and may have a width having a measured actual value of 18 counts. The next bar is narrow and has a measured actual value of 10 counts, which is followed by a wide bar which, due to a printing error has a measured actual value of 15 counts. The following bar is a wide element, having a measured actual value of 20 counts, which is followed by a narrow bar which again due to a printing error has a measured actual value of 14 counts. Thus, the measured values for the widths of the bar elements of the symbol 14 are 9, 12, 18, 10, 15, 20 and 14, from left to right respectively. A similar procedure may be employed for measuring the widths of the 25 spaces of the symbol 14, including the spaces 52, 55.

In step 60, the microprocessor 38 defines an erasure zone between two nominal values from a range of nominal values for the symbol elements. In the exemplary embodiments the range of nominal values includes narrow bars having a nominal value of 10 counts and wide bars having a nominal value of 20 counts. The erasure zone is defined between this pair of nominal values. There are many ways to define the precise limits of the erasure zone between the pair of nominal values, a variety of which will now be discussed with reference to a number of exemplary embodiments.

Figure 5:
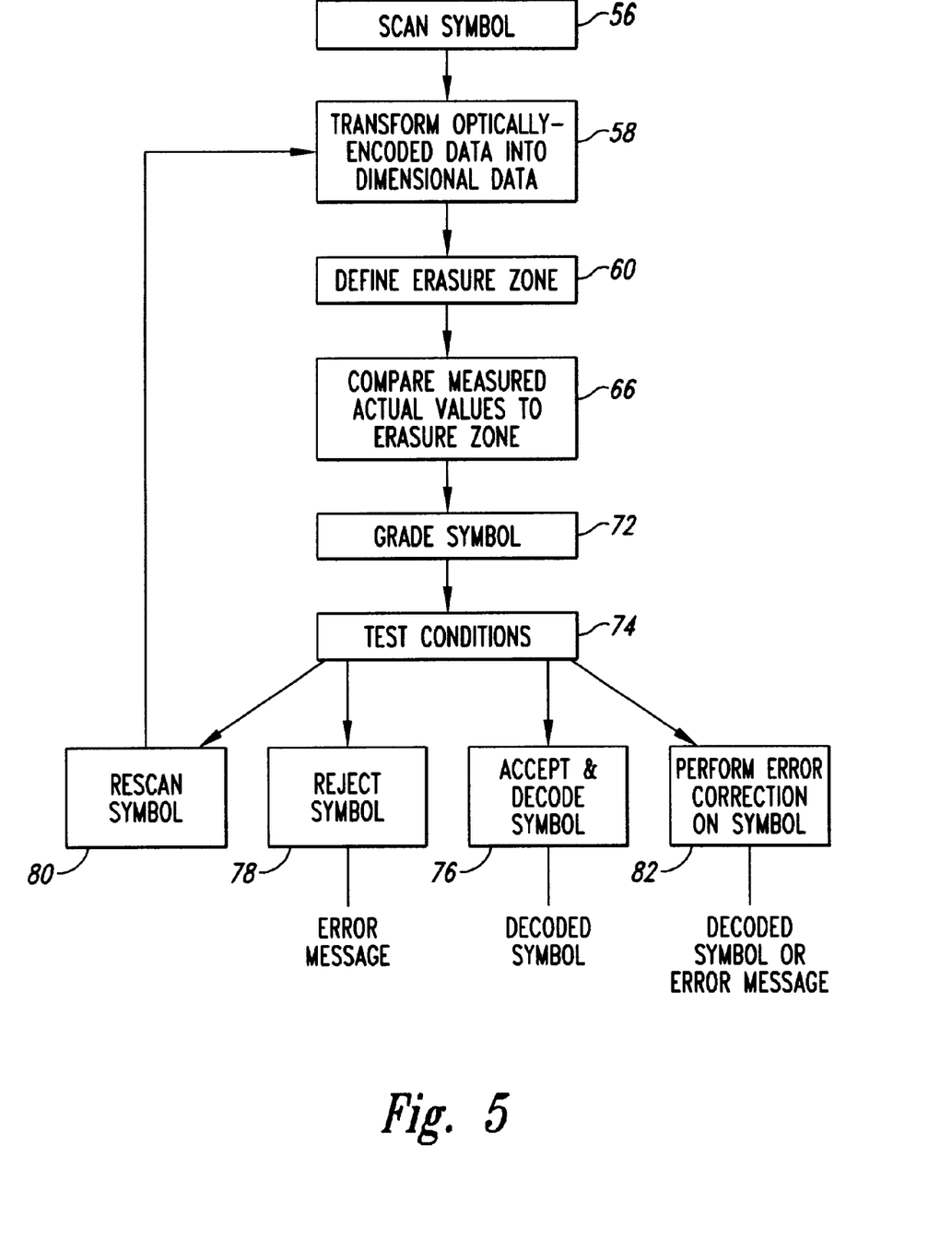
FIG. 5 is a flowchart of a method according to one embodiment of the invention.
Figure 6:
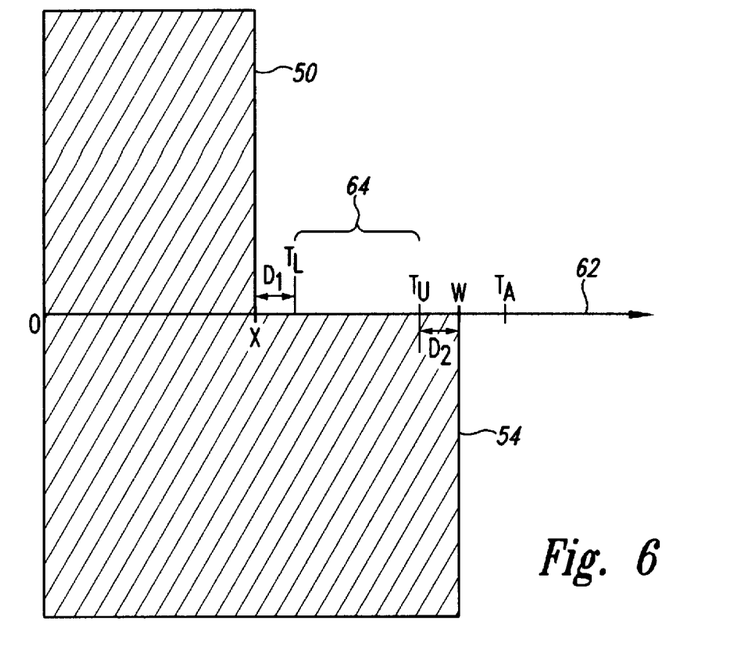
FIG. 6 is a schematic diagram showing a narrow symbol element and a wide symbol element of a bar code symbol disposed on either side of a number line for calculating the erasure zone according to a first embodiment.

A first exemplary method of defining the erasure zone is shown in FIG. 6. To ease understanding, the narrow bar element 50 and the wide bar element 54 are shown disposed on opposite sides of a number line 62. The number line 62 represents the width of the symbol elements 50, 54 in counts. The narrow symbol element 50 has a nominal width corresponding to a value of X counts. The wide bar element 54 has a nominal width corresponding to a value of W counts. The erasure zone 64 is defined between a lower threshold $T_L$ and an upper threshold $T_U$. The lower threshold $T_L$ is located a predefined distance $D_1$ from X. $T_L=X+D_1$ The upper threshold $T_U$ is located a predefined distance $D_2$ from W. $T_U=W-D_2$ Thus, a narrow bar element 50 may have a measured actual value exceeding the nominal value X by a value at most equal to the predefined value $D_1$ and still be identified as a narrow symbol element. Likewise, a wide symbol element may have a measured actual value which is less than the nominal value X by an amount equal to the predefined value $D_2$ while still being identified as a wide symbol element. In accordance with step 66 of FIG. 5, the symbol element with a measured actual value between the lower threshold $T_L$ and the upper threshold $T_U$ will be identified as an erasure. Thus, if $D_1$ and $D_2$ were set equal to 4, with X and W equal to approximately 10 and 20, respectively, and the actual measured values of the bar elements corresponded to those given above for symbol 14 (FIG. 4a), then the bar elements would be classified as: Narrow; Narrow; Wide; Narrow; Erasure; Wide; Erasure, from left to right, respectively. It should be noted that an additional threshold $T_A$ may be located at some given value $V_1$ from the nominal width W of the wide bar element 54 to ensure that the wide bar element 54 is not out of an acceptable upper range of measured values.

Alternative embodiments under the present invention are shown in FIGS. 7–10. These alternative embodiments are substantially similar to previously described embodiment and only the significant differences are described in detail below.

Figure 7:
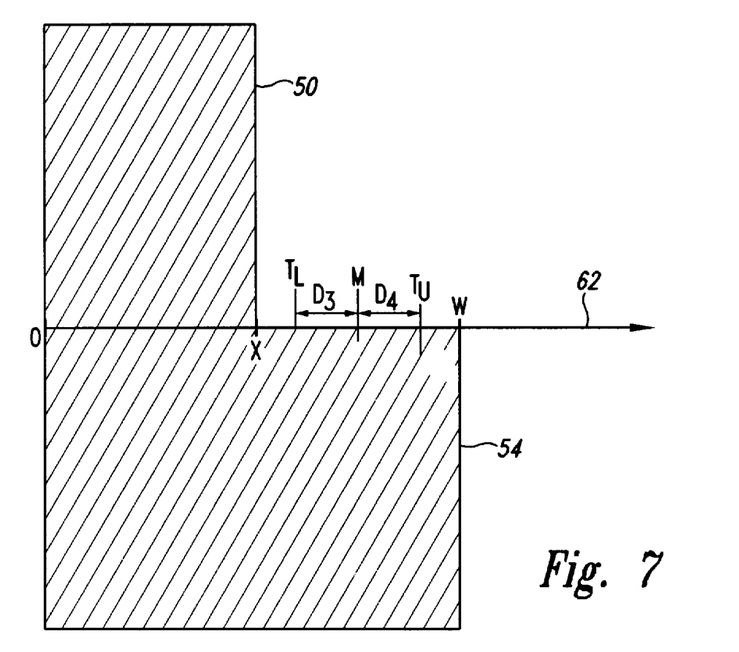
FIG. 7 is a schematic diagram showing a narrow symbol element and a wide symbol element of a bar code symbol disposed on either side of a number line for calculating an erasure zone according to a second embodiment.

With reference to FIG. 7, the lower threshold $T_L$ and the upper threshold $T_U$ may be defined as a distance $D_3$ and a distance $D_4$, respectively, from a median M which is defined approximately between the lower threshold $T_L$ and the upper threshold Tu. The distances $D_3$, $D_4$ may be some percentage %, of the difference in the nominal widths X, W of the narrow bar element 50 and the wide bar element 54. $T_L = M - \%_1(W-X)$; $T_U = M + \%_1(W-X)$ The percentage may be predefined, or may be entered as a user input. Thus, if the percentage was defined as 25%, then $D_3$ and $D_4$ would be equal to 2.5, and $T_L$ would be equal to 12.5, while $T_U$ would be equal to 17.5. The bar elements of symbol 14 (FIG. 4a) would thus be classified as: Narrow; Narrow; Wide; Narrow; Erasure; Wide; Erasure, from left to right, respectively.

Figure 8:
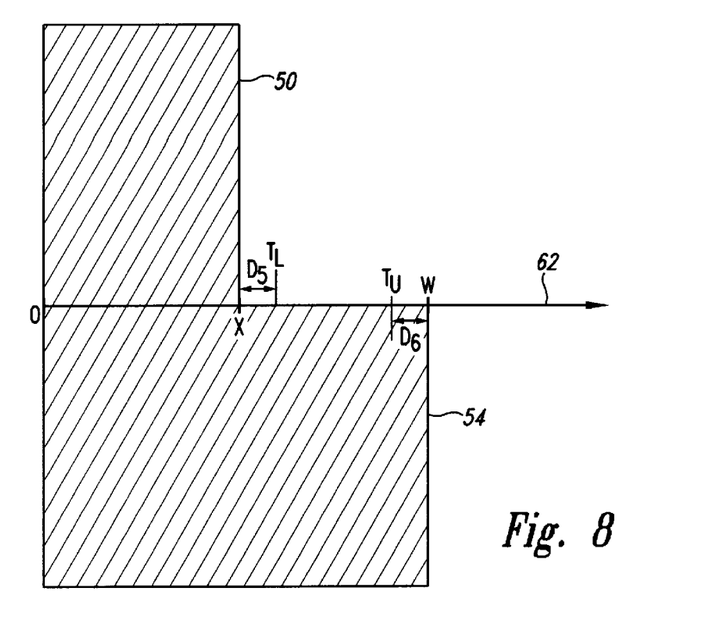
FIG. 8 is a schematic diagram showing a narrow symbol element and a wide symbol element of a bar code symbol disposed on either side of a number line for calculating the erasure zone according to a third embodiment.

With reference to FIG. 8, the lower threshold $T_L$ may be a distance $D_5$ from X while the upper threshold $T_U$ is a distance $D_6$ from W. The distances $D_5$, $D_6$ may be a respective first percentage $\%_1$ and second percentage $\%_2$ of the difference between the nominal values X, W of the narrow symbol element 50 and the wide symbol element 54, respectively. $T_L = X + \%_1(W-X)$; $T_U = W - \%_2(W-X)$. Thus, if the first percentage was defined as 25% and the second percentage as 20%, then $D_5$ would be equal to 2.5 and $D_6$ would be equal to 2.0, and $T_L$ would be equal to 12.5, while $T_U$ would be equal to 18. The bar elements of symbol 14 (FIG. 4a) would be classified as: Narrow; Narrow; Wide; Narrow; Erasure; Wide; Erasure, from left to right, respectively.

Figure 9:
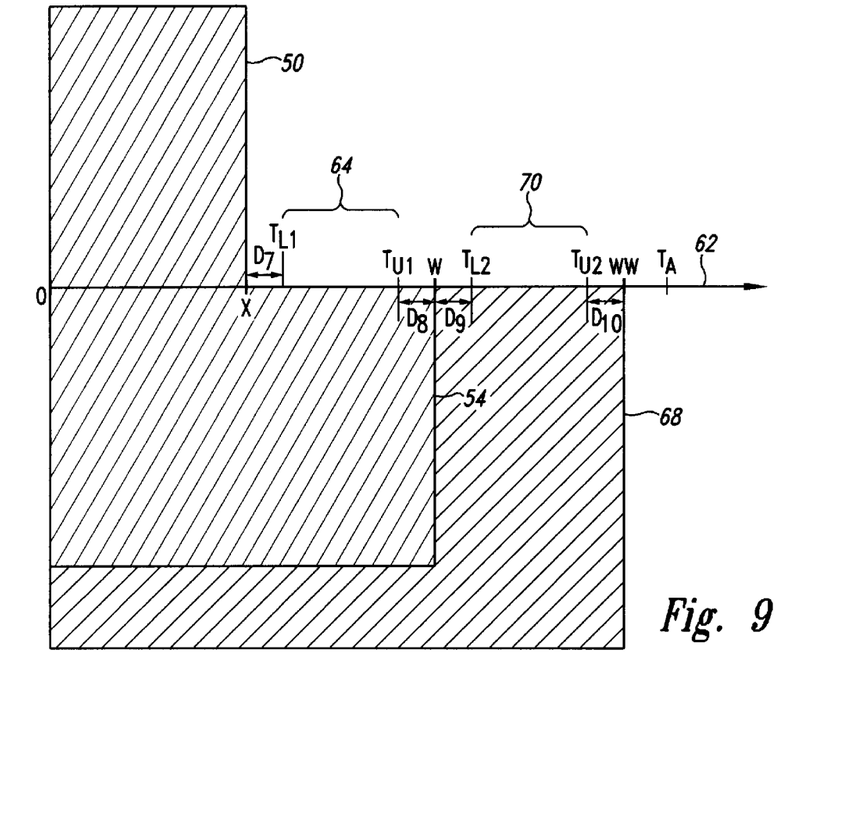
FIG. 9 is a schematic diagram showing a narrow symbol element on one side of a number line, an intermediate symbol element and a wide symbol element of a bar code symbol on the other side of the number line for calculating a first and a second erasure zone according to a fourth embodiment.

With reference to FIG. 9, a third symbol element 68 having a nominal value WW is shown, which is wider than the wide bar element 54. A first lower threshold $T_{L1}$ is defined a distance $D_7$ from the nominal value X of the narrow bar element 50, where the distance $D_7$ is equal to a first percentage $\%_1$ of the difference between the largest nominal value WW and the smallest nominal value X. $T_{L1} = X + \%_1$ (WW−X). A first upper threshold $T_{U1}$ is a distance $D_8$ from the nominal value W of wide symbol element 54, where the distance $D_8$ is equal to a second percentage $\%_2$ of the difference between the largest nominal value WW and the smallest nominal value X. $T_{U1} = W - \%_2$ (WW−X). The first erasure zone 64 is defined between the first lower threshold $T_{L1}$ and the first upper threshold $T_{U1}$. A second erasure zone 70 is defined between a second lower threshold $T_{L2}$ and a second upper threshold $T_{U2}$. The second lower threshold $T_{L2}$ is a distance $D_9$ from the nominal value W of the wide bar element 54, where the distance $D_9$ is a first percentage $\%_1$ of the difference between the largest nominal value WW and the smallest nominal value X. $T_{L2} = W + \%_1$ (WW−X). The second upper threshold $T_{U2}$ is a distance $D_{10}$ from the nominal value WW of the third symbol element 68, where the distance $D_{10}$ is equal to the second percentage $\%_2$ of the difference between the largest nominal value WW and the smallest nominal value X. $T_{U2} = WW - \%_2$ (WW−X). Thus, if the first percentage $\%_1$ was defined as 25%, then $D_7$ and $D_9$ would be equal to 5.0. If the second percentage $\%_2$ was defined as 20%, then $D_8$ and $D_{10}$ would be equal to 4. $T_{L1}$ would be equal to 15, while $T_{U1}$ would be equal to 16. $T_{L2}$ would be equal to 25, while $T_{U2}$ would be equal to 26. The bar elements of symbol 14' (FIG. 4b) would be classified as: Narrow; Narrow; Wide; Narrow; Narrow; Wide; Narrow; Triple Wide; Triple Wide, from left to right, respectively.

Figure 10:
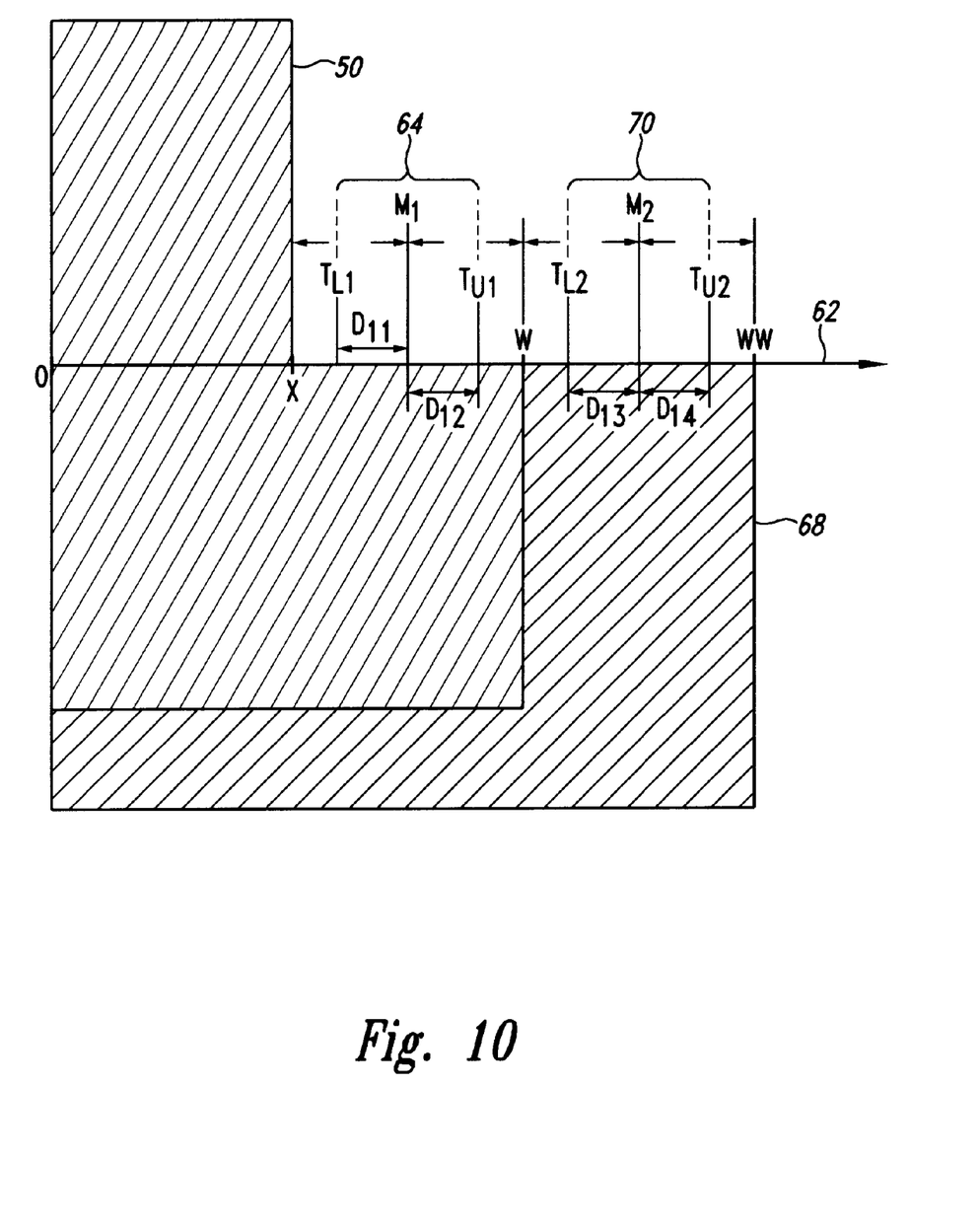
FIG. 10 is a schematic diagram showing a narrow symbol element on one side of a number line, an intermediate symbol element and a wide symbol element on the other side of the number line for calculating a first erasure zone and a second erasure zone according to a fifth embodiment.

With reference to FIG. 10, the first erasure zone 64 is defined between a first lower threshold $T_{L1}$ and a first upper threshold $T_{U1}$. The first lower threshold $T_{L1}$ is defined a distance $D_{11}$ from a median $M_1$ which lies approximately midway between the nominal value X for the narrow symbol element 50 and the nominal value W for the wide symbol element 54. The distance $D_{11}$ is equal to a first percentage $\%_1$ of the difference between the largest nominal value WW and the smallest nominal value X. $T_{L1} = M_1 - \%_1$ (WW−X). The first upper threshold $T_{U1}$ is a distance $D_{12}$ from the median $M_1$, where the distance $D_{12}$ is equal to a second percentage $\%_2$ of the difference between the largest nominal value WW and the smallest nominal value X. $T_{U1} = M_1 + \%_2$ (WW−X). A second erasure zone 70 is defined between a second lower threshold $T_{L2}$ and a second upper threshold $T_{U2}$. The second lower threshold $T_{L2}$ is defined a distance $D_{13}$ from a second median $M_2$, where the second median $M_2$ is approximately midway between the nominal value W of the wide symbol element 54 and the nominal value WW of the third symbol element 68. The distance $D_{13}$ is equal to a first percentage $\%_1$ of the difference between the largest nominal value WW and the smallest nominal value X. $T_{L2} = M_2 - \%_1$(WW−X). The second upper threshold $T_{U2}$ is defined a distance $D_{14}$ from the second median $M_2$, where the distance $D_{14}$ is equal to a second percentage $\%_2$ of the difference between the largest nominal value WW and the smallest nominal value X. $T_{U2} = M_2 + \%_2$ (WW−X). Thus, if the first percentage $\%_1$ was defined as 15%, then $D_{11}$ and $D_{13}$ would be equal to 3. If the second percentage $\%_2$ was defined as 10%, then $D_{12}$ and $D_{14}$ would be equal to 2. $T_{L1}$ would be equal to 12, while $T_{U1}$ would be equal to 17. $T_{L2}$ would be equal to 22, while $T_{U2}$ would be equal to 27. The bar elements of symbol 14a (FIG. 4b) would be classified as: Narrow; Narrow; Wide; Narrow; Erasure; Wide; Erasure; Erasure; Triple Wide, from left to right, respectively. The examples of FIGS. 9 and 10 may easily be extended to cover four wide and greater widths.

Once the measured actual values have been compared to the erasure zones, as in accordance with step 66 of FIG. 5, the microprocessor 38 may assign a grade to the symbol, Step 72. The grade may be based on the number of symbol elements having measured actual values which fall within a one of the erasure zones. The grade can be used for example, in determining the steps to be taken in further processing the symbol. For example, in step 74, the microprocessor 38 may test the grade against several conditions. For instance, if the grade satisfies a first condition, then the symbol may be accepted and decoded in accord with step 76. Such a situation could occur, for example, if the symbol received a high grade, such as an "A," or perhaps 100%. If the grade were to satisfy a second condition, then the symbol might be rejected as in accord with step 78. The symbology reader 10 should display an error message to the user when rejecting a symbol. Alternatively, the symbol 14 might be rescanned in accordance with step 80 when the grade satisfies the second condition. A grade which satisfies a third condition may trigger the performance of error correction, as in accordance with step 82. Error correction of symbols is well known and may include checksum error correction or structural error correction. In checksum error correction, an attempt to correctly interpret the symbol is made by employing a checksum which has been encoded into the symbol. Structural error correction employs a knowledge of the symbology definition to correctly interpret the symbol.

Although specific embodiments of the method and apparatus for reading symbols, defining erasures, and determining the proper way to handle the symbol, and examples of the present invention have been described above for illustrative purposes, various equivalent modifications may be made without departing from the spirit and scope of the invention, as will be recognized by those skilled in the relevant art. For example, while a variety of methods of defining the erasure zone have been discussed in terms of bar elements, the methods apply equally well to space elements and to measurable characteristics other than the widths of bars and spaces. Also, the teachings provided herein of the present invention can be applied to other symbol readers and symbologies, not necessarily the exemplary symbol reader and symbologies generally described above. For example, a hardwired system or programmed general purpose computer could be substituted for the microprocessor. The erasure zone defining step may be performed before or after the calculation of the dimensional data. Various other test conditions and subsequent processing step may be employed in addition to, or as substitutes for those discussed.

These and other changes can be made to the invention in light of the above detailed description. In general, in the following claims, the terms should not be construed to limit the invention to the specific embodiments disclosed in the specification and claims, but should be construed to include all apparatus and methods for reading symbols, defining erasure zones, and making soft decisions with respect to further processing of the symbol based on the number of symbol elements falling within erasure zones. Accordingly, the invention is not limited by the disclosure, but instead its scope is to be determined entirely by the following claims.

What is claimed is:

1. A method of operating a bar code reader to decode a bar code symbol, the bar code symbol composed of a plurality of bar and space elements, each of the bar elements associated with a nominal value selected from a range of nominal values including narrow and wide, the method comprising the steps of:

scanning the bar code symbol to produce a set of dimensional data points corresponding to a measured actual dimension of each of the bar elements;

defining at least one erasure zone between a pair of nominal values in the range of nominal values such that a lower threshold of the erasure zone is greater than a first one of the pair of nominal values and an upper threshold of the erasure zone is less than a second one of the pair of nominal values;

comparing each of the dimensional data points in the set of dimensional data points with the erasure zone.

2. The method of claim 1, further comprising the step of decoding the symbol if none of the dimensional data points in the set of dimensional data points is within the erasure zone.

3. The method of claim 1, further comprising the step of assigning a grade to the symbol based on a number of the dimensional data points in the set which fall within the erasure zone.

4. The method of claim 1, further comprising the steps of:
assigning a grade to the symbol based on a number of the dimensional data points in the set which fall within the erasure zone;
accepting the symbol if the assigned grade satisfies a first condition; and
rejecting the symbol if the assigned grade satisfies a second condition.

5. The method of claim 1, further comprising the steps of:
assigning a grade to the symbol based on a number of t he dimensional data points in the set which fall within the erasure zone;
accepting the symbol if the assigned grade satisfies a first condition; and
automatically rescanning the symbol if the assigned grade satisfies a second condition.

6. The method of claim 1, further comprising the steps of:
assigning a grade to the symbol based on a number of the dimensional data points in the set which fall within the erasure zone;
accepting the symbol if the assigned grade satisfies a first condition; and
performing error correction if the assigned grade satisfies a second condition.

7. The method of claim 1, further comprising the steps of:
assigning a grade to the symbol based on a number of the dimensional data points in the set which fall within the erasure zone;
accepting the symbol if the assigned grade satisfies a first condition;
performing error correction if the assigned grade satisfies a second condition; and
rejecting the symbol if the assigned grade satisfies a third condition.

8. The method of claim 1, further comprising the steps of:
assigning a grade to the symbol based on a number of the dimensional data points in the set which fall within the erasure zone;
accepting the symbol if the assigned grade satisfies a first condition; and
performing a check sum error correction if the assigned grade satisfies a second condition.

9. The method of claim 1, further comprising the steps of:
assigning a grade to the symbol based on a number of the dimensional data points in the set which fall within the erasure zone;
accepting the symbol if the assigned grade satisfies a first condition; and
performing a structural error correction if the assigned grade satisfies a second condition.

10. An article of manufacture having a computer readable program embodied therein for examining machine readable symbols composed of at least one symbol element, the symbol element associated with a nominal value selected from a symbol element range containing at least two nominal values for the symbol elements, the article comprising:

computer readable code for providing at least a first erasure zone between a pair of the nominal values from the symbol element range such that a lower threshold of the first erasure zone is greater than a first one of the pair of nominal values and an upper threshold of the first erasure zone is less than a second one of the pair of nominal values; and computer readable code for determining whether the symbol element falls within the erasure zone.

11. The article of claim 10, further comprising:
computer readable code for assigning a grade to the symbol, the grade corresponding to a number of the measured values within the erasure zones; and
computer readable code for rejecting the symbol if the assigned grade satisfies a first condition.

12. The article of claim 10, further comprising:
computer readable code for assigning a grade to the symbol, the grade corresponding to a number of the measured values within the erasure zones; and
computer readable code for automatically rescanning the symbol if the assigned grade satisfies a first condition.

13. The article of claim 10, further comprising
computer readable code for performing error correction on the symbol element if
the measured value of the symbol element falls within one of the erasure zones.

14. A method for decoding symbols composed of at least one symbol element, the symbol element associated with a nominal value selected form a symbol element range containing at least two discrete nominal values, the method comprising the steps of:
defining at least a first erasure zone between a pair of two adjacent discrete nominal values from the symbol element range such that the first erasure zones lies relatively above one of the pair of adjacent discrete nominal values and below the other of the pair of adjacent discrete nominal values; and
determining whether a measured value of the symbol element is within the first erasure zone.

15. The method of claim 14 wherein the step of defining at least a first erasure zone comprises the step of defining an upper threshold of the first erasure zone and a lower threshold of the first erasure zone, wherein the upper threshold and the lower threshold correspond to one of a dimension, an area, a geometry, a volume, a hue and a shade of the symbol element.

16. The method of claim 14 wherein the step of defining at least a first erasure zone comprises the step of defining an upper threshold and a lower threshold, wherein the upper threshold and the lower threshold correspond to a width of the symbol element.

17. The method of claim 14 wherein the step of defining at least a first erasure zone comprises the steps of:
defining a lower threshold such that the lower threshold is greater than a first nominal value of the pair of adjacent discrete nominal values, and
defining an upper threshold such that the upper threshold is less than a second nominal value of the pair of adjacent discrete nominal values.

18. The method of claim 14 wherein the step of defining at least a first erasure zone comprises the steps of:
defining a lower threshold such that the lower threshold is a first defined value greater than a first nominal value of the pair of adjacent discrete nominal values, and
defining an upper threshold such that the upper threshold is a second defined value less than a second nominal value of the pair of adjacent discrete nominal values.

19. The method of claim 14 wherein the step of defining at least a first erasure zone comprises the step of defining a lower threshold and an upper threshold such that the difference between the lower threshold and the upper threshold is approximately equal to a defined percentage of the difference between the pair of adjacent nominal values.

20. The method of claim 14 wherein the step of defining at least a first erasure zone comprises the steps of:
defining a lower threshold such that the lower threshold is spaced from a first nominal value of the pair of adjacent discrete nominal values by an amount equal to a first defined percentage of the difference between the first nominal value and a second nominal value of the pair of adjacent nominal values, and
defining an upper threshold such that the upper threshold is spaced from the second nominal value of the pair of adjacent discrete nominal values by a second defined percentage of the difference between the first nominal value and the second nominal value of the pair of adjacent nominal values.

21. The method of claim 14 wherein the step of defining at least a first erasure zone comprises the steps of:
defining a lower threshold such that the lower threshold is spaced from a first nominal value of the pair of adjacent discrete nominal values by an amount equal to a first defined percentage of the difference between a largest nominal value and a smallest nominal value of the range of nominal values; and
defining an upper threshold such that the upper threshold is spaced from a second nominal value of the pair of adjacent discrete nominal values by an amount equal to a second defined percentage of the difference between the largest nominal value and the smallest nominal value of the range of nominal values.

22. The method of claim 14 wherein the step of defining at least a first erasure zone comprises the steps of:
defining a lower threshold spaced from a median value by an amount approximately equal to a first defined percentage of the difference between a first nominal value and a second nominal value of the pair of adjacent nominal values, wherein the median value is defined approximately midway between the first nominal value and the second nominal value; and
defining an upper threshold spaced from the median value by an amount approximately equal to a second defined percentage of the difference between the first nominal value and the second nominal value.

23. The method of claim 14 wherein the step of defining at least a first erasure zone comprises the steps of:
defining a lower threshold spaced from a median value by an amount approximately equal to a first defined percentage of the difference between a smallest nominal value and a largest nominal value of the symbol element range, wherein the median value is defined approximately midway between a first nominal value and a second nominal value; and
defining an upper threshold spaced from the median value by an amount approximately equal to a second defined percentage of the difference between the smallest nominal value and the largest nominal value of the symbol element range.

24. The method of claim 14, further comprising the step of
assigning a grade to the symbol, the grade corresponding to the number of measured values within the erasure zone; and
rejecting the symbol if the assigned grade satisfies a first condition.

25. The method of claim 14, further comprising the step of
assigning a grade to the symbol, the grade corresponding to the number of measured values within the erasure zone; and automatically rescanning the symbol if the assigned grade satisfies a first condition.

26. The method of claim 14, further comprising the step of performing error correction on the symbol element if the measured value of the symbol element falls within the erasure zone.

27. A method of operating a symbology reader to decode a symbol composed of a plurality of symbol elements, each of the symbol elements possessing a measurable characteristic, the measurable characteristic of each of the symbol elements having a nominal value, the nominal value of each of the symbol elements selected from a range of nominal values, the method comprising the steps of:

defining at least a first erasure zone, the first erasure zone having at least a first threshold and a second threshold, the first threshold and the second threshold lying between a pair of adjacent nominal values from the range of nominal values such that one of the first and the second thresholds is greater than one of the pair of adjacent nominal values and the other of the first and the second thresholds is less than the other of the pair of adjacent nominal values;

acquiring a measurement of substantially an actual value of the measurable characteristic of each of the plurality of symbol elements comprising the symbol; and for each of the plurality of symbol elements successively comparing the measured actual value of the measurable characteristic to the first erasure zone.

28. The method of claim 27, further comprising the step of assigning a grade to the symbol based on the number of symbol elements that have the measured actual value within the first erasure zone.

29. The method of claim 27, further comprising the steps of:

assigning a grade to the symbol base on the number of symbol elements that have the measured actual value within the first erasure zone; and rejecting the symbol if the assigned grade exceeds a threshold grade.

30. The method of claim 27, further comprising the steps of:

assigning a grade to the symbol base on the number of symbol elements that have the measured actual value within the erasure zone; and automatically rescanning the symbol if the assigned grade exceeds a threshold grade.

31. The method of claim 27, further comprising the steps of:

assigning a grade to the symbol base on the number of symbol elements that have the measured actual value within the erasure zone;

rejecting the symbol if the assigned grade satisfies a first condition; and performing error correction if the assigned grade satisfies a second condition.

32. The method of claim 27, further comprising the steps of:

assigning a grade to the symbol base on the number of symbol elements that have the measured actual value within the erasure zone;

rejecting the symbol if the assigned grade satisfies a first condition; and performing a check sum error correction if the assigned grade satisfies a second condition.

33. The method of claim 27, further comprising the steps of:

assigning a grade to the symbol base on the number of symbol elements that have the measured actual value within the erasure zone;

rejecting the symbol if the assigned grade satisfies a first condition; and performing a structural error correction if the assigned grade satisfies a second condition.

34. The method of claim 27 wherein the step of defining at least a first erasure zone includes the step of defining a plurality of erasure zones, one of the plurality of erasure zones between each pair of adjacent nominal values in the range of nominal values.

35. A data collection terminal for collecting data from a symbol comprised of a plurality of symbol elements, the data collection terminal comprising:

a memory, the memory storing a set of nominal data values;

a scanner, the scanner measuring a set of measured values, each of the measured values corresponding to a characteristic of a respective one of the symbol elements and producing a set of dimensional data points corresponding to the measured values; and a microprocessor, the microprocessor in communication with the memory for defining at least a first erasure zone between a pair of adjacent nominal data values from the set of nominal data values such that a lower threshold of the erasure zone is greater than a first one of the pair of adjacent nominal values and an upper threshold of the erasure zone is less than a second one of the pair of adjacent nominal values, the microprocessor responsive to the scanner for comparing each of the set of dimensional data points with at least the first erasure zone.

36. The data collection terminal of claim 35, further comprising a decoder, the decoder responsive to the microprocessor and the scanner to decode the set of dimensional data points.

37. The data collection terminal of claim 35, further comprising a decoder, the decoder responsive to the microprocessor and the scanner to decode the set of dimensional data points if none of the dimensional data points in the set of dimensional data points is within the first erasure zone.

38. The data collection terminal of claim 35, further comprising microprocessor readable logic for assigning a grade to the symbol based on a number of the dimensional data points in the set of dimensional data points which are within the first erasure zone;

a decoder, the decoder responsive to the microprocessor and the scanner to decode the set of actual values if the grade satisfies a first condition.

39. The data collection terminal of claim 35, further comprising microprocessor readable logic for assigning a grade to the symbol based on a number of the dimensional data points in the set of dimensional data points which are within the first erasure zone;

a decoder, the decoder responsive to the microprocessor and the scanner to decode the set of actual values if the grade satisfies a first condition and to rescan the symbol if the grade satisfies a second condition.

40. The data collection terminal of claim 35, further comprising microprocessor readable logic for assigning a grade to the symbol based on a number of the dimensional data points in the set of dimensional data points which are within the first erasure zone;

a decoder, the decoder responsive to the microprocessor and the scanner to decode the set of actual values if the grade satisfies a first condition and to reject the symbol if the grade satisfies a second condition.

41. The data collection terminal of claim 35, further comprising microprocessor readable logic for assigning a grade to the symbol based on a number of the dimensional data points in the set of dimensional data points which are within the first erasure zone;

a decoder, the decoder responsive to the microprocessor and the scanner to decode the set of actual values if the grade satisfies a first condition and to perform error correction on the symbol if the grade satisfies a second condition.

42. A reader for reading an optical symbol, the reader comprising:

a scanner portion having an input port which receives optically encoded data relating to information stored in the geometry of the optical symbol, the scanner portion responsive to the optically encoded data to transform the optically encoded data into a set of dimensional points; and a programmed computer portion connected to an output port of the scanner portion to receive the set of dimensional points, the programmed computer portion responsive to the dimensional points to identify the number of the dimensional points that fall within an erasure zone having a lower threshold greater than a first nominal value and an upper threshold less than a second nominal value.

43. The reader of claim 42, further comprising a decoder, the decoder responsive to the programmed computer portion and the scanner portion to decode the set of dimensional data points if none of the dimensional data points in the set of dimensional data points is within the erasure zone.

44. The reader of claim 42, further comprising computer readable logic for assigning a grade to the symbol based on a number of the dimensional data points in the set of dimensional data points which are within the first erasure zone;

a decoder, the decoder responsive to the programmed computer portion and the scanner portion to decode the set of actual values if the grade satisfies a first condition.

45. The reader of claim 42, further comprising computer readable logic for assigning a grade to the symbol based on a number of the dimensional data points in the set of dimensional data points which are within the first erasure zone;

a decoder, the decoder responsive to the programmed computer portion and the scanner portion to decode the set of actual values if the grade satisfies a first condition and to rescan the symbol if the grade satisfies a second condition.

46. The reader of claim 42, further comprising computer readable logic for assigning a grade to the symbol based on a number of the dimensional data points in the set of dimensional data points which are within the first erasure zone;

a decoder, the decoder responsive to the programmed computer portion and the scanner portion to decode the set of actual values if the grade satisfies a first condition and to reject the symbol if the grade satisfies a second condition.

47. The reader of claim 42, further comprising computer readable logic for assigning a grade to the symbol based on a number of the dimensional data points in the set of dimensional data points which are within the first erasure zone;

a decoder, the decoder responsive to the programmed computer portion and the scanner portion to decode the set of actual values if the grade satisfies a first condition and to perform error correction on the symbol if the grade satisfies a second condition.

* * * * *